United States Patent [19]

Richardson

[11] 4,236,213
[45] Nov. 25, 1980

[54] APPARATUS FOR PRODUCING PULSE WIDTH MODULATED SIGNALS

[75] Inventor: James D. Richardson, Kokomo, Ind.

[73] Assignee: General Motors Corporation, Detroit, Mich.

[21] Appl. No.: 963,694

[22] Filed: Nov. 27, 1978

[51] Int. Cl.³ .................... G05B 15/00; F02D 37/00; H03K 3/017
[52] U.S. Cl. .................... 364/431; 340/171 PF; 364/900; 123/417
[58] Field of Search ............... 369/431, 442, 200, 900; 340/167 A, 171 PF; 325/142, 143; 123/32 EA, 32 EC

[56] References Cited

U.S. PATENT DOCUMENTS

| | | | |
|---|---|---|---|
| 3,106,636 | 10/1963 | McIntyre et al. | 364/900 |
| 3,611,300 | 10/1971 | Aldrich et al. | 364/900 |
| 3,702,462 | 11/1972 | England | 364/900 |
| 3,914,580 | 10/1975 | Watson et al. | 123/32 EA |
| 4,003,033 | 1/1977 | O'Keefe et al. | 364/900 |
| 4,024,510 | 5/1977 | Pearson | 364/900 |
| 4,048,965 | 9/1977 | Bianchi et al. | 123/32 EA |
| 4,069,795 | 1/1978 | Long et al. | 123/32 EA |
| 4,071,889 | 1/1978 | Sumida et al. | 364/900 |
| 4,085,449 | 4/1978 | Walsh et al. | 364/900 |
| 4,090,245 | 5/1978 | Hamasaki et al. | 364/900 |
| 4,140,087 | 2/1979 | Daumer et al. | 364/431 |
| 4,143,622 | 3/1979 | Klötzner et al. | 123/32 EC |

*Primary Examiner*—Felix D. Gruber
*Attorney, Agent, or Firm*—Albert F. Duke

[57] ABSTRACT

A microprocessor based engine control system including an engine control unit for producing a plurality of pulse width modulated output signals of programmable frequency. The pulse width and frequency of each output is contained in a control word provided to the engine control unit. The control word contains a pulse width number and a frequency code. The control unit includes a free-running counter and logic means which switches the output signal to one level when the number of stages of the counter defined by the frequency code are all zero and switches the output signal to a second level when the content of the aforementioned number of counter stages is greater than the pulse width modulated number.

9 Claims, 6 Drawing Figures

| RAM BITS 16 15 14 13 | | | | REP. RATE | SPW/CPW DEFINED IN BITS | |
|---|---|---|---|---|---|---|
| | | | | | RAM 102 | COUNTER 104 |
| 1 | 1 | 1 | 1 | 125 H | 1-8 | 2-9 |
| 1 | 1 | 1 | 0 | 62.5 H | 1-9 | 2-10 |
| 1 | 1 | 0 | 1 | 31.25 H | 1-10 | 2-11 |
| 1 | 0 | 1 | 1 | 15.625 H | 1-11 | 2-12 |
| 0 | 1 | 1 | 1 | 7.8125 H | 1-12 | 2-13 |

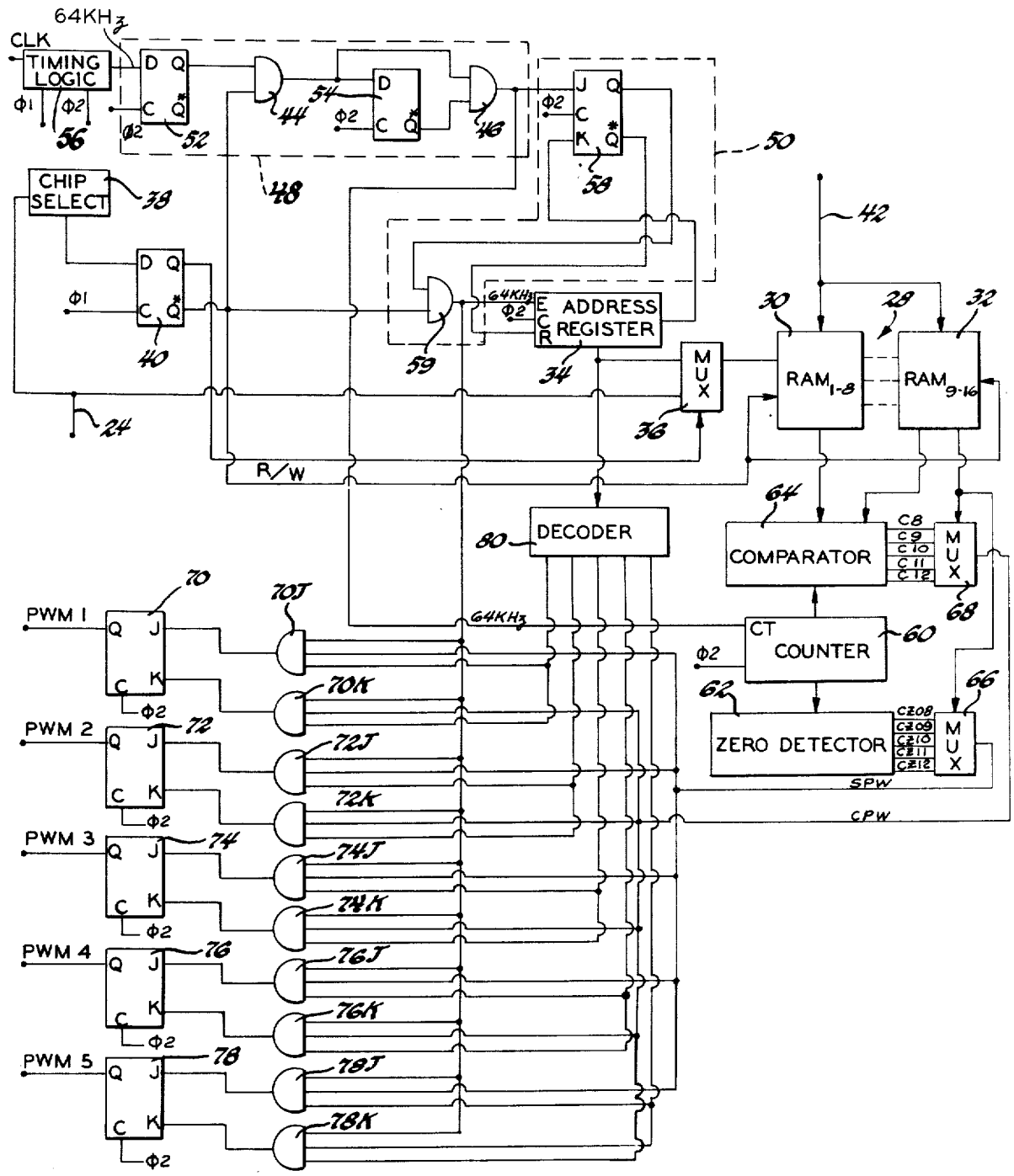
Fig. 2
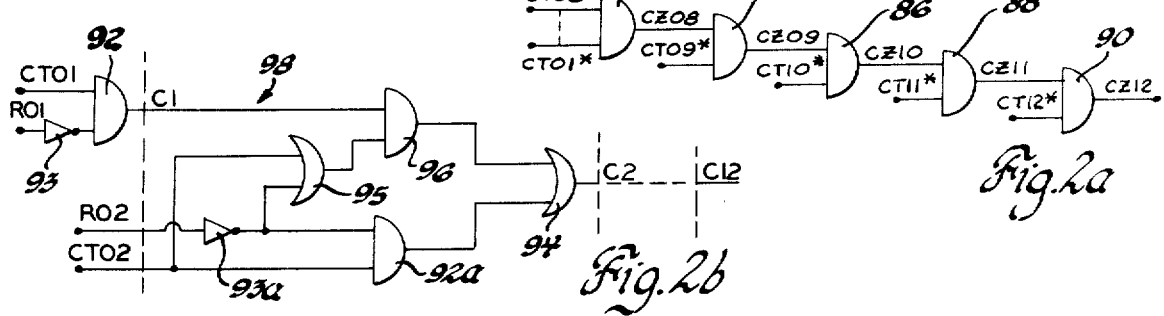
Fig. 2a
Fig. 2b

APPARATUS FOR PRODUCING PULSE WIDTH MODULATED SIGNALS

FIELD OF THE INVENTION

This invention relates to engine control systems and, more particularly, to a microprocessor based engine control system including an engine control unit interfacing the microprocessor and engine control actuators.

BACKGROUND OF THE INVENTION

Digital systems for controlling a motor vehicle engine require the gathering of data regarding existing engine operating conditions and the generation of control signals for maintaining a desired engine operating condition. The output control signals of the system usually are pulse width modulated signals at differing frequencies dependent on actuator design. The system usually includes a plurality of dedicated input counters for pulse accumulation or pulse interval measurement and a plurality of dedicated output counters for generating the output signals. A central processor processes the input data and distributes the necessary output data to, and controls the operation of, the various output counters to generate the signals necessary to achieve the desired operating condition. Since engine control parameters must be updated at short intervals of time, servicing the various output devices becomes unmanageable as the number of control functions increases.

BRIEF DESCRIPTION OF THE DRAWINGS

It is accordingly an object of the present invention to provide an engine control system including an engine control unit interconnected with a microprocessor and adapted to control a plurality of engine control actuators in response to control words from the microprocessor to reduce the data processing load on the microprocessor.

It is another object of the present invention to provide an engine control system including an engine control unit which responds to control words from a microprocessor to generate a plurality of pulse width modulated output signals having a frequency and pulse width specified by the control words.

In accordance with the present invention a microcomputer, including a microprocessor and memory, is coupled with a control unit for controlling engine functions such as vehicle speed, air/fuel sensor heater, air/fuel ratioing or other functions requiring a pulse width modulated output signal. The pulse width as well as the frequency of each output signal is specified by the microcomputer in the form of a control word. Each control word corresponding to a respective output signal is loaded by the microcomputer into a preassigned location in a read/write memory of the control unit. The control unit further includes a binary counter which is free-running, i.e., continuously incremented by a clock source. A first portion of each control word defines the pulse width of a respective output signal in terms of a particular state of the counter. The number of bits of the first portion of the control word which is significant for purposes of defining the pulse width of the particular output is specified by a second portion of the control word. The control unit also comprises a logic unit which includes zero detector means and comparator means. The logic unit decodes the second portion of the control word, and sets the appropriate output when the significant bits of the counter, as specified by the control word, are zero. When the state of the counter is equal to or greater than the state specified in the first portion of the control word, the appropriate output is reset. Thus, the waveform of a plurality of outputs may be determined by respective control words which contain both the pulse width information and a frequency code which effectively varies the operating length of the counter, zero detector and comparator. In one embodiment of the invention, the control unit includes dedicated logic for generating the required outputs whereas in a second embodiment, the control unit includes a microprogrammed read only memory for controlling the data flow within the control unit to generate the required outputs.

A more complete understanding of the present invention may be had from the following detailed description which should be read in conjunction with the drawings in which:

BRIEF DESCRIPTION OF THE DRAWINGS

Figures 1, 4:
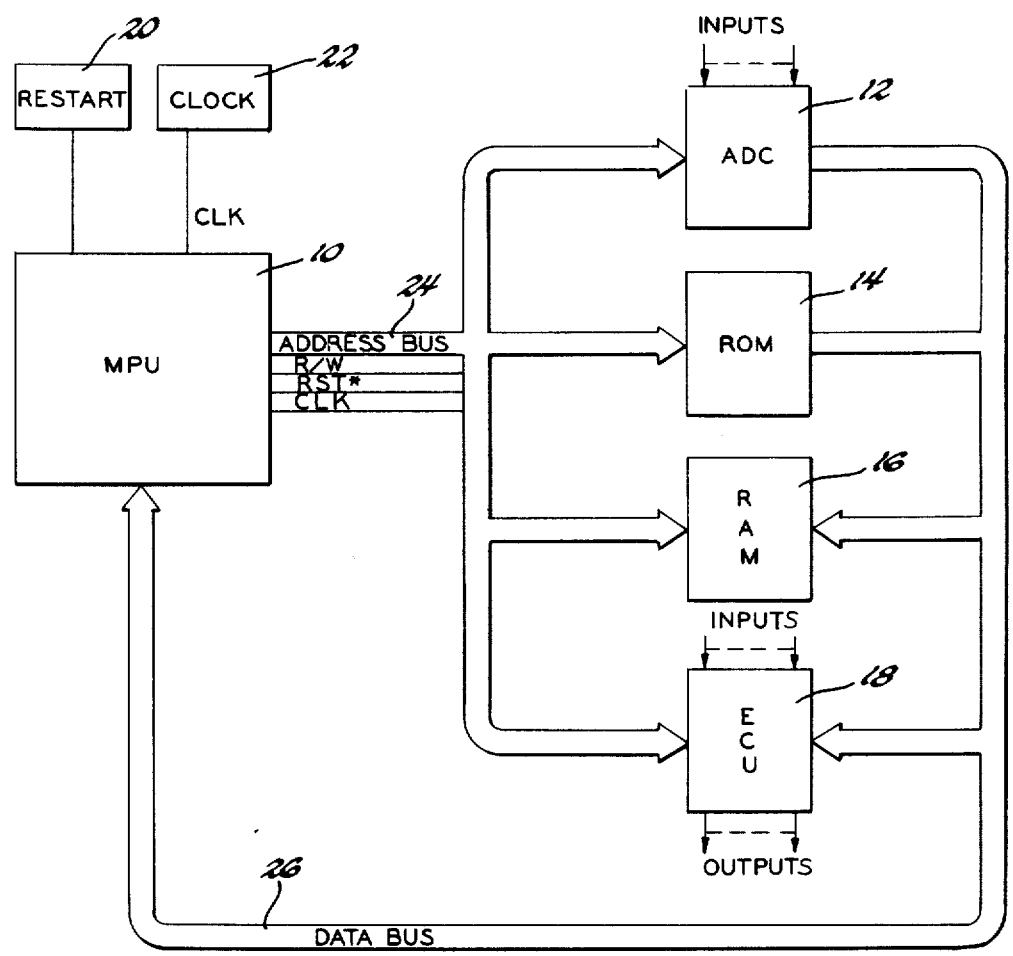
Figure 3:
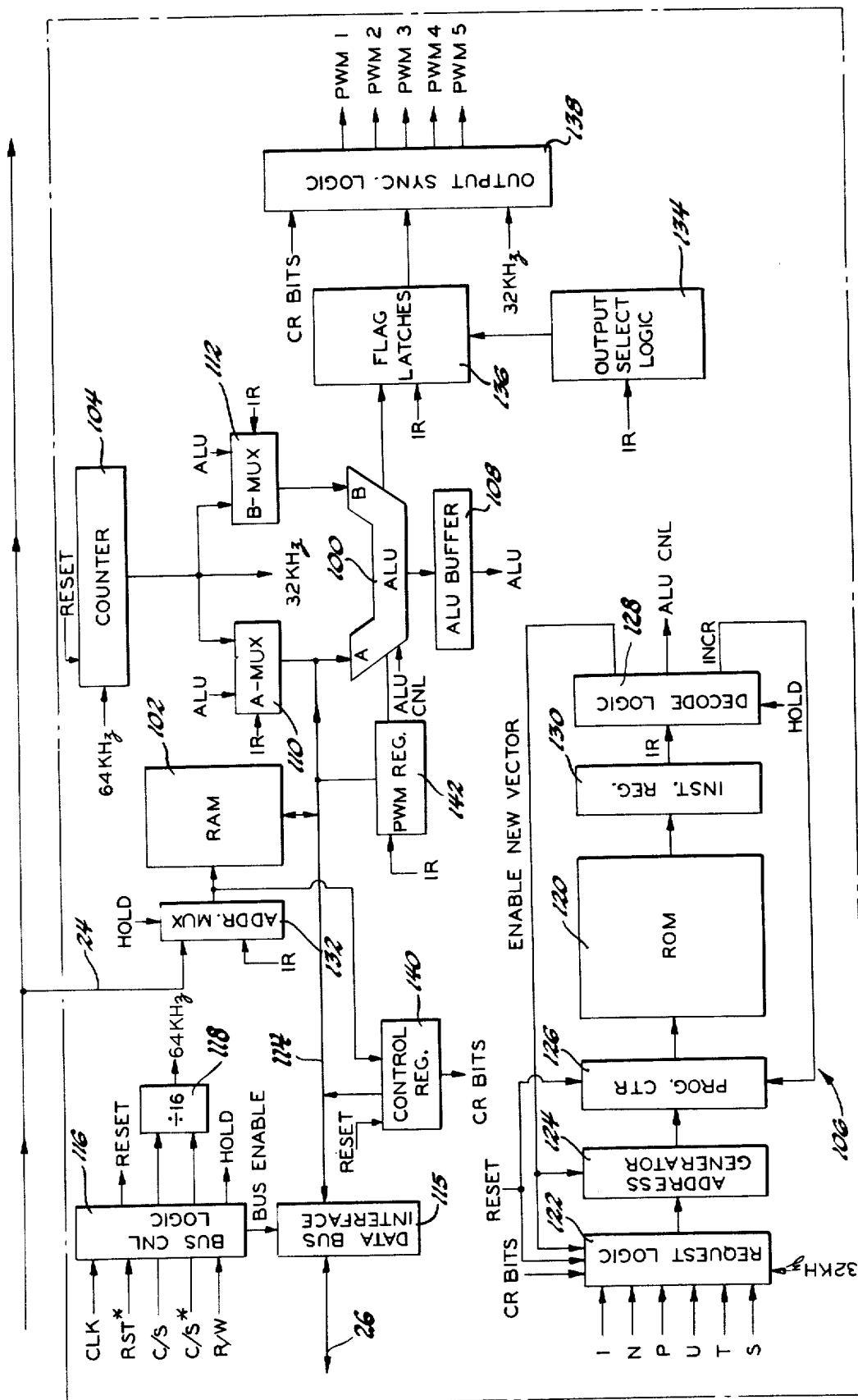

FIG. 1 is a block diagram of the engine control system of the present invention;

FIG. 2 is a block diagram of one embodiment of the engine control unit of the system;

FIGS. 2a and 2b are a more detailed logic diagram of the zero detector and comparator in the engine control unit;

FIG. 3 is a block diagram of a second embodiment of the engine control unit; and FIG. 4 is a chart showing the various frequencies of an output as determined by the control word.

DESCRIPTION OF THE PREFERRED EMBODIMENT

Referring now to the drawings and initially to FIG. 1, the engine control system of the present invention includes a microprocessor (MPU) 10, an A/D converter (ADC) 12, a read only memory (ROM) 14, a read/write memory (RAM) 16 and an engine control unit (ECU) 18. The MPU 10 is preferably the MC6800 microprocessor described in the M6800 Microprocessor Application Manual available from Motorola Semiconductor Products, Inc., Phoenix, Arizona and incorporated herein. The ADC 12, ROM 14 and RAM 16 may be any of a number of commercially available units compatible with the MPU 10. The MPU 10 receives inputs from a restart circuit 20 and generates a RST* signal for initializing the remaining components of the system. The MPU 10 also receives inputs from a two phase clock 22 and generates the required timing signals for the remainder of the system. The MPU 10 communicates with the rest of the system via a 16 bit address bus 24 and a 8 bit bi-directional data bus 26.

The ADC 12 preferably includes both the analog and digital subsystems normally associated with such units but if desired the MPU 10 may be programmed to perform the function of the digital subsystem as described in application note AN-757, Analog to Digital Conversion Techniques with the M6800 Microprocessor System, available from Motorola Semiconductor Products, Inc., Phoenix, Arizona and incorporated herein.

The ADC 12 receives a plurality of engine parameter inputs such as manifold vacuum, atmospheric pressure, coolant temperature, manifold mixture temperature and inlet air temperature. The A to D conversion process is initiated on command from the MPU 10 which selects the input channel to be converted. At the end of the conversion cycle the ADC 12 generates an interrupt after which the data is read over the data bus 26 on command from the MPU 10. The ROM 14 contains the program for operating the MPU 10 and further includes appropriate engine control data in the form of look-up tables which define the pulse width of output control signal waveforms based on engine input data. The look-up table data may be obtained experimentally or derived analytically. The data defining pulse width is 12 bits and is combined with a 4 bit code specifying the frequency to form a 16 bit control word. To conserve memory the 4 bit code, which will of course be the same for a plurality of pulse widths, may be added after accessing the pulse width data. The combined 16 bit control word is transferred to the ECU 18 for generation of various output signals for controlling engine operating conditions. The ECU may also receive inputs from the vehicle of a variable frequency character such as those relating to vehicle speed and engine RPM.

Referring now to FIG. 2, one embodiment of the invention is disclosed which includes hardware dedicated to generation of a plurality of pulse width modulated output signals whose frequency is program-selected. The apparatus comprises a 16 bit read/write memory generally designated 28 shown as comprising a pair of interconnected 8 bit RAM's 30 and 32. The memory 28 is addressable internally of the ECU 18 by means of a three stage address register 34 or externally of the ECU 18 by the MPU 10 over address bus 24. Addresses from the register 34 or MPU 10 are selectively fed to the memory 28 through multiplexer 36 which is controlled from chip select logic 38 through a flip-flop 40. The Q output of the flip-flop 40 controls the multiplexer 36 while the Q* output provides read/write control of the memory 28. A 16 bit internal ECU data bus 42 is coupled with the MPU data bus 26 through a data bus interface, not shown, which permits the two 8 bit bytes of a 16 bit control word to be transferred to the ECU 18 on successive MPU cycles and loaded into memory 28 simultaneously with transfer of the second byte. Thus, when the ECU 18 is selected by the MPU 10 for data transfer, the memory 28 is placed in the write mode and the data on the bus 42 is written in the memory location defined by the address on the bus 24. Each of the control words which control the pulse width and frequency of respective ones of a plurality of output signals, designated PWM1-PWM5, are loaded into respective locations in the memory 28 from the MPU 10. The address register 34 is enabled by a rise detector generally designated 48 and address control logic generally designated 50. The rise detector 48 includes D-type flip-flops 52 and 54 and gates 44 and 46. The input to the flip-flop 52 is from timing logic 56 which responds to the CLK input from MPU 10, which may be 1.024 KHz for example, and produces a 64 KHz signal as well as $\phi 1$ and $\phi 2$ timing signals at 1.024 MHz. The address control logic 50 includes a JK flip-flop 58 and a gate 59. The address register 34 is normally enabled at the 64 KHz rate, however, when the ECU 18 is selected by the MPU 10 the read/write line from the Q* output of the flip-flop 40 goes low and halts generation of internal addressing by disabling gates 44 and 59. The address register is enabled from the Q output of flip-flop 58 when the rising edge of the 64 KHz signal is detected by the detector 48. After being enabled the register 34 is clocked by $\phi 2$ to sequence through its eight binary states to produce eight addresses whereupon the register 34 is reset from the flip-flop 58. In the particular embodiment shown only five of the eight addresses are used.

A 12 stage binary counter 60 is incremented at the 64 KHz rate, synchronized with the $\phi 2$ clock and provides its content as input to a zero detector 62 and a comparator 64. The detector 62 provides separate outputs indicating whether the least significant 8, 9, 10, 11 or 12 bits of the counter 60 are zero. A first portion of each control word, for example the least significant 12 bits thereof, are also input to the comparator 64. The comparator 64 produces separate outputs, C8-C12, indicating the results of comparison of the least significant 8, 9, 10, 11 and 12 bits of the control word with the least significant 8, 9, 10, 11 or 12 bits, respectively, of the counter 60. A comparator output is high if the counter input is greater than the corresponding input from the RAM 28. Multiplexers 66 and 68 decode a second portion of the control word, for example, the most significant four bits thereof to select corresponding ones of the output channels of the detector 62 and comparator 64, to provide respective set pulse width (SPW) and clear pulse width (CPW) signals. The SPW output is applied to the J inputs of JK flip-flops 70-78 through gates 70J-78J, respectively, while the CPW signal is applied to the K inputs of flip-flops 70-78 through gates 70K-78K, respectively. The flip-flops 70-78 are clocked in synchronism with $\phi 2$ clock. The decoder logic 80 is responsive to the content of the register 34 and selects the appropriate one of the flip-flops 70-78 corresponding to the RAM location addressed by the register 34 by enabling one of the gate pairs 70J;70K-78J;78K. The zero detector 62 and multiplexer 66 form variable length zero detector means with the length being selectable by the binary code contained in the four most significant bits of the control word. Similarly, the comparator 64 and multiplexer 68 form variable length comparator means. That is to say, the number of bits of the counter 60 which are detected for zero state condition, or are compared with the control word, is variable depending on the four bit binary code.

The detector 62 is shown in more detail in FIG. 2a and includes an AND gate 82 having inputs connected to the Q* outputs of the least significant 8 stages of the counter 60. The gates 84, 86, 88 and 90 receive inputs from the Q* output of stages 9, 10, 11 and 12, respectively, of the counter 60 and the output of the gates 82, 84, 86 and 88, respectively. The outputs of the gates 82, 84, 86, 88 and 90 provide the comparator outputs CZ08-CZ12. The compare logic for bits 1 and 2 is shown in FIG. 2b and includes an AND gate 92 whose inputs are the lease significant bit R01 from the memory location inverted by an inverter 93, and the least significant bit CT01 of the counter 60. Accordingly, the output C1 of the gate 92 is high whenever the least significant bit of the counter 60 is greater than the least significant bit of the memory location. The output C2 of gate 94 is high if CT02 is greater than R02 as detected by the gate 92a, and inverter 93a, or CT01 is greater than R01 as detected by gate 92 and CT02 is equal to R02 as detected by the gates 95 and 96. Additional blocks (not shown) of logic 98 may be cascaded to produce the outputs C8 through C12. For example, C8=C7 (CT08+R08*)+CT8·R8*. It will be appreciated that the logic of the comparator 64 may be modified in a well-known manner to produce a high output as soon as the counter content is equal to the RAM content if such is desired.

The operation of the circuit is as follows assuming that the control words for the outputs PWM1-PWM5 have been loaded into the memory 28 from the MPU 10. The counter 60 is incremented at a 64 KHz rate. During each state of the counter 60 the register 34 is sequenced through its eight states by the $\phi 2$ clock and thereby addresses the five memory locations corresponding to the output PWM1-PWM5. As the data in each address is sequentially read out of the memory 28, the upper four bits select the desired input to the multiplexer 66 and 68 from the detector 62 and comparator 64, respectively. Assuming the first memory location address corresponds to PWM1, the decoder 80 enables the gates 70J and 70K and the output of flip-flop 70 is set if the selected number of bits of the counter 60 are all zero, and cleared if the selected number of bits of the counter 60 are greater than the corresponding bits in the control word addressed in the memory 28. Each of the remaining outputs are selected and the comparison and detection process is performed relative to the bit length defined by the four most significant bits of the control word. After all memory locations have been addressed the register 34 is reset and on the next 64 KHz clock pulse the counter 60 is incremented and the process is repeated. In this manner, each of the outputs PWM1-PWM5 which are applied to individual engine control actuators (not shown) are controlled in both frequency and pulse width by means of a control word obtained from the MPU 10.

Referring now to FIG. 3, the PWM concept embodied in FIG. 2 is incorporated in a microprogrammed implementation of the ECU 18 which is suitable for carrying out a number of other engine control functions in addition to PWM control. The ECU 18 includes an arithmetic logic unit (ALU) 100, a 16 bit RAM 102, a 16 bit binary counter 104 and a sequence control logic generally designated 106 which control the operations of the ECU. The ALU 100 includes a 16 bit adder for performing addition or subtraction and logic for performing the variable zero detect and variable compare operations. The results of arithmetic operations of the ALU are temporarily stored in a 16 bit buffer 108. The content of counter 104 or the ALU result in buffer 108 may be selectively input to the ALU A or B ports through multiplexers 110 and 112, respectively. The content of a RAM register is read into the A port of ALU 100 over a bi-directional data bus 114. The content of the counter 104 or the content of buffer 108 may be routed to an addressed RAM location through the multiplexer 110. The data bus 114 is interfaced with the 8 bit external data bus 26 through interface logic 115 which permits the two 8 bit bytes of a 16 bit ECU word to be transferred between the ECU 18 and the MPU 10 on successive MPU cycles. Bus control logic 116 receives the designated inputs from the MPU 10. The chip select lines C/S and C/S* are two lines of address bus and serve to select the ECU 18 for data transfers. The logic 116 produces an internal RESET signal, $\phi 1$ and $\phi 2$ clock signals, a HOLD signal and a BUS ENABLE signal. The clock signals $\phi 1$ and $\phi 2$ are generated in response to the CLK input and provide the internal clocking of the ECU 18 at the same rate that the MPU 10 is operating, for example, 1.024 MHz. $\phi 1$ and $\phi 2$ provide inputs to a ÷16 divider 118 which produces a 64 KHz input to the counter 104.

The sequence control logic 106 includes a microprogrammed ROM 120. Each instruction of the microprogram specifies the internal data routing in the ECU 18 to accomplish a desired operation. The control logic 106 includes request logic 122 which stores service request in appropriate latches and establishes relative priority for service of the requests. Inputs to the logic 122 depend on the engine function to be controlled and may include an engine speed reference signal, a vehicle speed reference signal, one or more variable frequency inputs from position to frequency transducers, as well as internally generated flag inputs and one or more inputs of selected frequency from the counter 104. In the PWM control a 32 KHz signal from the counter 104 is input to the logic 122. An address generator 124 responds to the logic 122 and presets a program counter 126 to the starting address of the routine in ROM 120 for servicing the input selected by the logic 122. The state of the counter 126 is decoded by the ROM 120 and the instruction addressed is loaded into a 16 bit instruction register 130. Each instruction specifies the operation to be performed by the ALU 100, the data inputs to A and B ports thereof and output devices involved. Certain bits of each instruction are decoded by logic 128 to control the operation of the ALU 100. The RAM address in each instruction is routed through multiplexer 132 and decoded within the RAM 102. The multiplexer 132 is also connected with an appropriate number of bits of the address bus 24 permitting access to the RAM 102 by the MPU 10. The output code in each instruction specifies the routing of data through multiplexers 110 and 112 to the A and B ports of the ALU 100 and the operation to be performed by the ALU relative to the data. The output address in the instruction is decoded by logic 134 to select one of a plurality of flag latches 136. The data loaded in the selected latch may be derived from the ALU 100 as in the case of the SPW and the CPW data or may be contained in the instruction and loaded in the selected latch either unconditionally or conditioned upon the results of an ALU operation. The outputs from the flag latches 136 are inputs to synchronization logic 138 which includes a plurality of output latches. These latches are clocked from selected outputs of the counter 104 to synchronize the outputs. In the PWM control the outputs are synchronized to the 32 KHz signal. The control logic 106 generates an enable new vector signal when called for by the instruction at the end of each service routine. The enable new vector signal resets the latch which initiated the routine and enables the highest priority pending request to be serviced. The control logic 106 also produces an INCR signal which increments the counter 126 to the next ROM location so that each instruction in the selected routine is sequentially loaded into the register 130. Thus, input signals from the vehicle or time signals from the counter 104 constitute service requests which are held and priority encoded, with service being granted to the highest priority request if the sequence control logic is idle or at the completion of the service routine in progress. The priority code serves as the microprogram entry point with the resulting service routine controlling what RAM location is effected, or what output signal is involved. At completion of the service routine, the activating request is reset, and the logic is made available for other uses. The ECU 18 includes a control register 140 which is loaded from the MPU 10 to enable the desired inputs to the logic 122 and the desired outputs of the logic 138. The ECU 18 also includes a 4 bit PWM register 142 which is loaded with the binary code in the four most significant bits of the PWM control words contained in the RAM 102 when the PWM routine is called. The content of the PWM register 142 is decoded in the ALU 100 to determine the bit length of significance in the first portion of the control word.

The bus control logic 116 generates the HOLD signal in response to the C/S, C/S* and R/W signals whenever the ECU 18 is selected by the MPU 10 for data transfer. The HOLD signal routes the appropriate address bits from the bus 24 to the RAM 102 for decoding rather than the address contained in the ROM 120. The HOLD signal is also input to the decode logic 128 to stop operation of the ECU for one cycle of the MPU 10. The RESET signal is generated on power-up of the MPU and initialized the counter 104, control register 140, request logic 122 and program counter 126.

The ALU 100 includes variable zero detect logic, such as shown in FIG. 2a. This logic is responsive to the state of the counter 104 and provides inputs to decode logic in the ALU 100 which selects one of the CZ08-CZ12 outputs for producing the SPW signal. The variable bit length comparison, to provide the CPW signal, is accomplished by subtracting the least significant 12 bits of the RAM location from corresponding bits of the counter 104 (by 2's complement addition) and detecting whether a carryout from the appropriate stage of the adder occurs. For example, a carryout will occur from the 8th stage of the adder if the least significant eight bits of the counter 104 is equal to or greater than the corresponding bits of the addressed RAM location. The carryout from stages 8-12 of the adder correspond to the C8-C12 outputs of FIG. 2b and the decode logic in the ALU 100, responds to the PWM register content, to select one of the outputs for producing the CPW signal. It is assumed in this embodiment that the control word defines the pulse width of the output signal to a resolution of 1/32 KHz rather than 1/64 KHz as in FIG. 2. Accordingly, the ALU 100 includes a shift right function which shifts the content of the counter 104 one bit to the right. Thus, the least significant 12 bits (1-12) of the RAM location are compared with the bits 2-13 of the counter 104.

The operation of the circuitry of FIG. 3 is as follows assuming that the control register 140 has enabled the 32 KHz input to the logic 122 and the PWM1-PWM5 outputs of the logic 138. Each 32 KHz clock pulse the PWM routine in ROM 120 is called. This routine causes the five PWM control words to be sequentially strobed into the A port of ALU 100 on successive ECU clock cycles (1.024 MHz). At the same time the corresponding flag latches 136 are selected by the logic 134. As each control word is entered in the ALU 100, bits 13-16 are strobed into the PWM register 142. With reference to FIG. 4, if bits 13-16 of the word read from RAM 102 to the register 142 contain, for example, 1101, the SPW command will cause the selected output flag to set when bits 2-11 of the counter 104 are all 0. If bits 2-11 of the counter 104 are equal to or greater than bits 1-10 of the word read into the ALU, the CPW command will cause the selected output flag to be cleared. The outputs of flag latches 136 are inputs to respective flip-flops in the output synchronization logic 72 which produce the PWM1-PWM5 outputs synchronized to the 32 KHz clock.

The embodiments of the invention in which an exclusive property or privilege is claimed are defined as follows:

1. Apparatus for generating a pulse width modulated output signal comprising means for storing a control word having a first portion and a second portion, free-running counter means, logic means responsive to the content of said counter means and to said control word, said logic means producing a set pulse width command when a selectable number of bits of said counter means are all the same binary value, said logic means producing a clear pulse width command if the magnitude of said selectable number of bits of said counter means bear a predetermined relationship to the magnitude of a corresponding number of bits of said first portion of said control word, said logic means responsive to the second portions of said control word for selecting the number of bits of said counter utilized in producing said set pulse width and said clear pulse width command, and bistable switching means responsive to said set pulse width and clear pulse width commands for producing an output signal which is at one level in response to said set pulse width command and at a second level in response to said clear pulse width command whereby the pulse width of the output signal is defined by said first portion of said control word and the frequency of the output signal is defined by said second portion of said control word.

2. An engine control system comprising microcomputer means responsive to engine operating conditions for developing a control word having a first portion specifying the pulse width of an output signal and a second portion specifying the frequency of said output signal, free-running counter means,
logic means including detector means for detecting the state of a selected number of bits of said counter means, comparator means for comparing said selected number of bits of said counter means with said first portion of said control word, and decoding means responsive to the second portion of said control word for selecting the number of bits of said counter means to be detected and compared; said logic means producing a set pulse width command if the selected bits of said counter means are all the same state, said logic means producing a clear pulse width command if the selected bits of said counter means have a value equal to or greater than the value of a corresponding number of bits of said first portion of said control word,
bistable switching means responsive to said set pulse width and clear pulse width commands for producing a bilevel output signal having a pulse width defined by said first portion of said control word and a frequency defined by said second portion of said control word, and
actuating means responsive to said output signal for affecting the operation of said engine.

3. An engine control system comprising microcomputer means responsive to engine operating parameters for developing a control word having a first portion specifying the pulse width of an output signal and a second portion specifying the frequency of said output signal, an engine control unit coupled to said microcomputer means for data exchange therewith and including at least one RAM register for storing said control word, free-running counter means, logic means including detector means, comparator means, decoding means and sequence control logic, said sequence control logic transferring said control word from said RAM register to said logic means each time said counter means is incremented, said decoding means responsive to the second portion of said control word for selecting a certain number of bits of said counter means, said detector means producing a set pulse width command if the selected bits of said counter means are all at the same state, said comparator means producing a clear pulse width command if said selected bits of said counter means have a value equal to or greater than a corresponding number of bits of said first portion of said control word, bistable switching means responsive to said set pulse width and clear pulse width commands for producing a bilevel output signal having a pulse width defined by said first portion of said control word and a frequency defined by said second portion of said control word, and actuator means responsive to said output signal for affecting the operation of said engine.

4. An engine control system comprising microcomputer means responsive to engine operating parameters for developing a control word for each of a plurality of output devices affecting the operation of the engine, an engine control unit coupled to said microcomputer means for data exchange therewith and including a plurality of RAM registers adapted to be loaded with respective ones of said control words by said microcomputer means, free-running counter means, each of said control words having a first portion thereof defining the pulse width of an output signal in terms of the state of a specified number of bits of said counter means, each of said control words having a second portion thereof defining said number of bits of said counter means, logic means including means for decoding the second portion of said control word and for producing a set pulse width command if the specified number of bits of said counter are at the same logic level and for producing a clear pulse width command if the specified number of bits of said counter have a value greater than the value of a corresponding number of bits of the first portion of said control word, a plurality of bistable switching means controlling respective ones of said output devices and responsive to said set pulse width and clear pulse width commands for producing a bilevel output having a pulse width and frequency defined by said control word, and means for sequentially transferring said plurality of control words from said registers to said logic means and for selecting a corresponding one of said bistable switching means for receipt of said commands.

5. An engine control system comprising a microcomputer, means providing input data to said microcomputer, said microcomputer adapted to develop a plurality of control words defining desired engine operating conditions in response to said input data, an engine control unit coupled to said microcomputer for data exchange therewith and including a counter, means for continuously clocking said counter, a plurality of RAM registers adapted to be loaded with respective ones of said control words by said microcomputer, a plurality of bistable output devices corresponding to respective ones of said RAM registers and responsive to a set pulse width command and a clear pulse width command for producing a bilevel output signal, logic means responsive to said control word and the state of said counter means for producing said set and clear pulse width commands, each of said control words having a first portion containing a pulse width number and a second portion containing a coded representation of the number of bits of said counter to be utilized by said logic means in producing said commands, microprogrammed control means, means providing a fixed frequency input to said microprogrammed control means, said microprogrammed control means sequentially transferring the content of said plurality of RAM registers to said logic means and selecting a corresponding one of said output devices in response to said fixed frequency input, said logic means producing said set pulse width command if the number of bits of said counter means specified by the code in said second portion of said control word are all the same value and producing said clear pulse width command if the count represented by the said number of bits of said counter means is greater than the pulse width number contained in said first portion of said control word.

6. An engine control system comprising computer means responsive to engine operating conditions for developing a control word defining a desired operating condition of the engine, a microprogrammed control unit for developing an output signal in accordance with said control word, an address bus and a data bus coupling said computer means to said control unit to permit transfer of data including said control word between said control unit and said computer means, said control unit including an internal data bus, read/write memory means coupled to said internal data bus, an arithmetic logic unit (ALU) having first and second inputs and an output, said first input being coupled to said internal data bus, free-running counter means, means connecting the output of said counter means to said second input of said ALU, read only memory means having a plurality of addressible locations each containing a program instruction, program counter means coupled with said read only memory for sequentially addressing said locations, request logic responsive to at least one input for loading said program counter with a starting address in said read only memory means, an instruction register coupled to said read only memory means for storing the instructions addressed by said program counter, multiplexer means coupled to said computer and to said instruction register for permitting selective access to said read/write memory by said computer and said read only memory means under the control of said computer, bistable output means, decode logic coupled with said instruction register for establishing internal data paths within said control unit as specified by the instruction in said instruction register, said ALU including means for performing arithmetic and logic operations relative to the content of said counter means with the content of locations in said read/write memory means and for controlling the state of said bistable output means as a function of the value of the content of said counter means and said control word.

7. An engine control system comprising microcomputer means for producing a control word in response to engine operating conditions, said control word defining a desired operating condition of the engine,
- a microprogrammed control unit for producing a pulse width modulated output signal in accordance with said control word,
- an address bus, a data bus, and control lines interconnecting said microcomputer means and said control unit to permit data transfer between said microcomputer means and said control unit,
- said control unit comprising an internal data bus,
- bus interface means connecting said internal data bus to said first mentioned data bus,
- read/write memory means connected with said internal data bus for storing said control word,
- arithmetic logic means having first and second inputs and an output, said first input being connected with said internal data bus,
- free-running counter means,
- means for generating a HOLD signal whenever said microcomputer means communicates with said control unit,
- means connecting the output of said free-running counter means to said second input of said arithmetic logic means,
- read only memory means storing a microprogram including a plurality of instructions,
- program counter means connected with said read only memory means for sequencing through said instructions,
- request logic means for loading said program counter means with a starting address in said read only memory, said request logic means responsive to an input of predetermined frequency,
- an instruction register connected with said read only memory for storing the instructions addressed by said program counter means,
- multiplexer means permitting selective access to said read/write memory by said microcomputer means or said microprogram dependent on the state of said HOLD signal,
- bistable output means,
- decode logic connected with said instruction register for establishing data paths within said control unit as specified by the instruction in said instruction register, said decode logic adapted to control the loading of said program counter means and responsive to said HOLD signal for interrupting the microprogram during transfer of data between said microcomputer and said control unit,
- said arithmetic logic means including means for comparing the state of said free-running counter means and the content of a location in said read/write memory means containing said control word and for controlling the state of said bistable output means as a function of the value of the content of said free-running counter means and said control word.

8. Apparatus for generating a pulse width modulated output signal comprising means for storing a control word having a first portion containing a pulse width number and a second portion containing a frequency code, free-running counter means, logic means responsive to the content of said counter means and said control word, said logic means responsive to said frequency code for selecting certain bits of said counter means and certain bits of said first portion of said control word, said logic means producing a first command when said selected bits of said counter means are all the same binary value, said logic means producing a second command when the selected bits of said counter means bear a predetermined relationship to the selected bits of said first portion of said control word, and means responsive to said first and second commands for producing a bi-level output signal.

9. Apparatus for generating a pulse width modulated output signal comprising
- a binary counter,
- clock means for continuously incrementing said counter,
- means for storing a control word having a first portion containing a pulse width number and a second portion containing a coded representation of the number of bits of said counter to be considered in determining the frequency and pulse width of the output signal,
- bistable switching means responsive to a set pulse width and a clear pulse width command for producing said output signal,
- logic means responsive to said control word and to the state of said counter for producing said set and clear pulse width commands, said logic means producing said set pulse width command when the number of bits of said counter specified by the code in said second portion of said control word are all zero, and producing said clear pulse command when the count represented by said number of bits is greater than the number contained in said first portion of said control word.

* * * * *

UNITED STATES PATENT AND TRADEMARK OFFICE
CERTIFICATE OF CORRECTION

PATENT NO. : 4,236,213

DATED : November 25, 1980

INVENTOR(S) : James D. Richardson

It is certified that error appears in the above-identified patent and that said Letters Patent are hereby corrected as shown below:

Column 1, line 31, "BRIEF DESCRIPTION OF THE DRAWINGS" should read -- SUMMARY OF THE INVENTION --.

Signed and Sealed this

Nineteenth Day of May 1981

[SEAL]

Attest:

RENE D. TEGTMEYER

Attesting Officer

Acting Commissioner of Patents and Trademarks